United States Patent

[11] 3,567,023

[72] Inventors Kenneth Ernest Buckman
Winsor, near Woodlands;
Derrick Percival Tuffnell, Southampton, England
[21] Appl. No. 840,913
[22] Filed July 11, 1969
[45] Patented Mar. 2, 1971
[73] Assignee General Motors Corporation
Detroit, Mich.
[32] Priority July 13, 1968
[33] Great Britain
[31] 33541/68

[54] VALVED FILTER SUPPORT TUBE
7 Claims, 9 Drawing Figs.
[52] U.S. Cl. .................................................. 210/130,
210/136, 210/247, 210/440, 210/443
[51] Int. Cl. ..................................................... B01d 35/14,
B01d 27/10
[50] Field of Search ........................................... 210/130,
136, 247, 440, 443

[56] References Cited
FOREIGN PATENTS
982,466  2/1965  Great Britain ............... 210/T.O. Digest

*Primary Examiner*—Frank A. Spear, Jr.
*Attorneys*—E. W. Christen and P. A. Taucher ABSTRACT: In a liquid filter, particularly an internal combustion engine oil filter, a plastics support tube, externally grooved to provide drainage channels, fits within one end of the element and has a projecting castellated portion and a flange which seals against said one end of the element, whilst a combined annular seal and relief valve member of elastomeric material has an outer flange which normally overlies inlet openings in an end plate of the filter casing, an inner peripheral portion sealed to the end plate around a central outlet opening in the end plate, and a coaxial neck which fits within the support tube and seals against the latter adjacent the castellated portion, the said outer flange being resiliently deflected by liquid entering the inlet openings and the seal between the neck and support tube being broken, to permit a bypass flow of liquid directly between the inlet and outlet openings when the pressure on the neck, through the castellations, exceeds a predetermined value.

PATENTED MAR 2 1971

Inventors
Kenneth Ernest Buckman &
Derrick Percival Tuffnell
BY Peter A. Gaucher
Attorney

PATENTED MAR 2 1971

Inventors
Kenneth Ernest Buckman &
Derrick Percival Tuffnell
BY Peter A. Gaucher
Attorney

VALVED FILTER SUPPORT TUBE

This invention relates to liquid filter units and in particular to oil filter units such as are used in the lubrication systems of internal combustion engines.

The invention is specially applicable to discardable filter units in which a filter element is retained within a filter casing having an end plate with inlet and outlet openings therein and an annular gasket by which the filter unit is sealed to a mount face on the engine when the unit is screwed on to the mount face by means of cooperating threaded spigot and socket members on the mount face and the unit.

In a liquid filter unit according to the invention opposite sides of an annular filter element are during use respectively placed in direct communication with inlet and outlet openings at one end of a casing for the element by means of a seal member which also constitutes a nonreturn valve; a relief valve, the movable member of which forms part of the seal member, is arranged adjacent said one end of the filter casing to permit a bypass flow of liquid between the inlet and outlet openings at said end when the pressure drop across the element exceeds a predetermined value; and the fixed member of the relief valve forms part of a support tube which extends partly within the element, which has annular flange members adapted respectively to form a seal with the movable valve member and with one end of the element around the central opening therethrough, and which includes formations by which liquid can pass directly from said inlet to said outlet openings by way of the relief valve when the filter unit is blocked.

The filter element is preferably formed of pleated synthetic resin-impregnated filter paper, the pleats extending longitudinally of the element, so that the element is of star-form in section, and the ends of the pleats preferably being individually sealed separately from adjacent pleats.

The scope of the invention is defined by the appended claims; and the invention and the method by which it is to be performed are hereinafter particularly described with reference to the accompanying drawings, in which:

Like parts in the drawings bear similar reference numerals.

Figure 1:
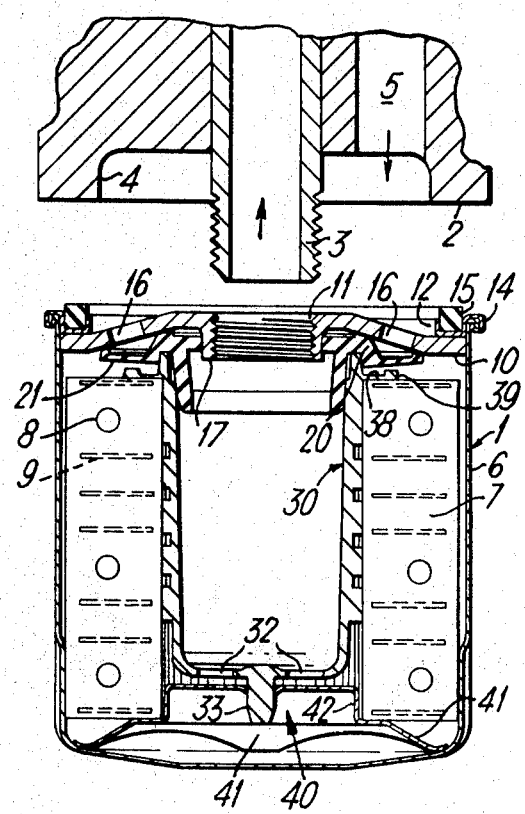
FIG. 1 is a vertical section of a preferred embodiment of a filter unit according to the invention and of a mount face on an internal combustion engine on which the filter unit is to be mounted.
Figure 2:
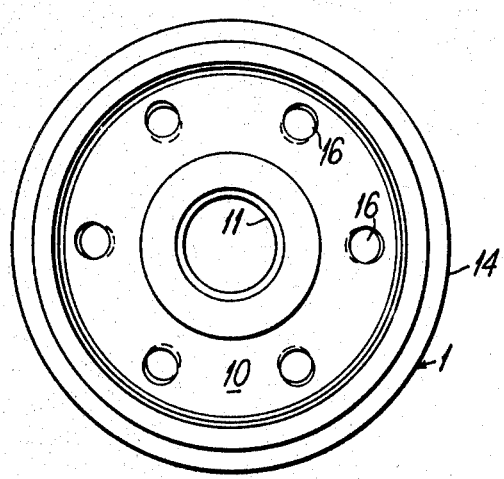
FIG. 2 is a plan of the filter unit shown in FIG. 1.

FIG. 1 of the drawings shows an oil filter unit 1 which is adapted to be secured on an internal combustion engine mount face 2 by being screwed on to a threaded oil inlet spigot 3 which projects from the mount face 2 and is surrounded by an annular recess 4 which is in communication with an oil outlet passage 5 of the engine lubrication system.

The filter unit 1 comprises a thin sheet metal casing 6 within which is housed a filter element 7 of pleated synthetic resin-impregnated filter paper, the pleats extending longitudinally of the element 7 so that the element is of start form in section and the ends of the pleats being individually sealed separately from adjacent pleats. The pleat are formed with spacer dimples 8 and ribs 9 impressed therein so as to space each pleat from adjacent pleats and to space the two halves of each pleat described and illustrated in the specification of British Pat. No. 880,812, and will not therefore be further described herein.

The filter casing 6 is a cup-shaped pressing of relatively thin sheet metal, the open end of the casing being closed by a thicker annular end plate 10 having a central threaded outlet opening 11 therein, the periphery of the plate 10 having secured thereto, as by welding, an annulus of thin sheet metal 12 which is secured by a lockseam joint 14 to the end of the cup-shaped pressing 6. The sheet metal annulus 12 is formed so as to have a rectangular U-shaped section in which an annular gasket 15 of elastomeric material is retained adjacent the periphery of the end plate 10 to form a seal with the mount face 2 when the filter unit 1 is screwed on to the threaded spigot 3. The end plate 10 has therein a plurality of inlet openings 16 around the central outlet opening 11, the latter being formed in an internally extending coaxial neck portion 17 of the end plate 10.

Extending around the neck 17 on the end plate 10 is an annular seal member 20—(which also acts as a relief valve)—(see FIGS. 6 and 7) of synthetic rubber or plastics material, formed as an annular disc with an integral outwardly extending resilient flange 21 which normally overlies and seals the inlet openings 16 in the end plate 10 and acts as a nonreturn valve. The disc 20 has an inner peripheral portion 22 which forms a sliding seal with the neck 17 of the end plate 10; and intermediate the inner peripheral portion 22 and the flange 21 the disc has a face 23 which abuts the inner surface of the end plate 10. The seal member 20 has a neck 24 which extends coaxially from the central portion thereof from the side opposite the face 23, the neck 24 constituting the movable member of a relief valve, the fixed seat for which is formed by an internal annular portion of a support tube 30, one end of which extends within one end of the filter element 7.

Figure 6:
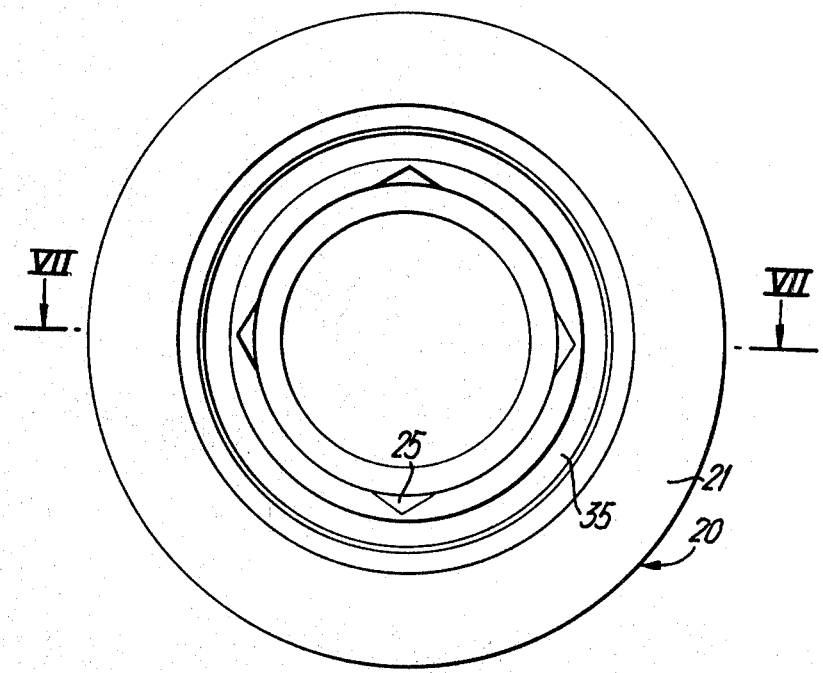
FIG. 6 is an inverted plan, to a larger scale, of a seal and relief valve member forming part of the unit shown in FIG. 1.
Figure 7:
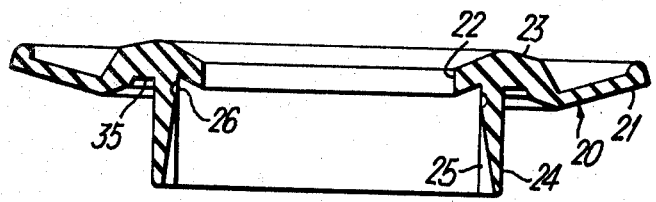
FIG. 7 is a section on the line 7-7 of FIG. 6.

The neck 24 is preferably formed, as shown in FIGS. 6 and 7, with a plurality of tapering notches 25 in its inner surface, parallel to the axis of the seal member 20, the depth of the notches decreasing towards the junction of the neck with the central portion of the seal member disc. These ends of the notches 25 may extend into an annular groove 26 formed at the inner surface of the neck adjacent its junction with the inner peripheral portion 22 thereof, for a purpose to be described hereinafter.

Figure 3:
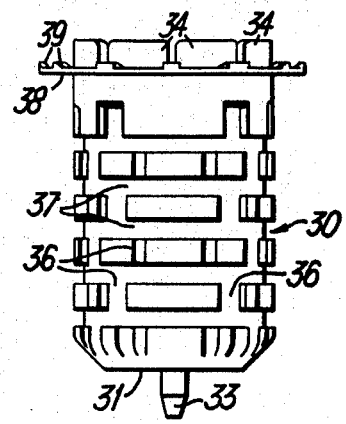
FIG. 3 is an elevation of a support tube for the filter element which forms part of the unit shown in FIG. 1.
Figure 4:
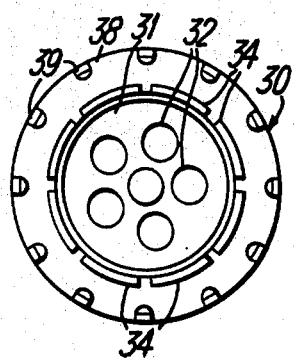
FIG. 4 is a plan of FIG. 3.
Figure 5:
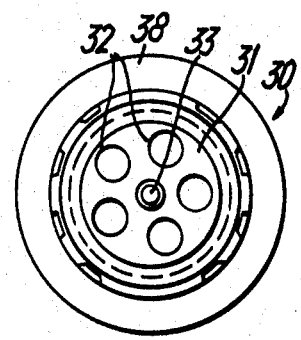
FIG. 5 is an inverted plan of FIG. 3.

The support tube 30 (FIGS. 3 to 5) is preferably made of plastics material and is of generally tubular form and of a size to be a press fit within the annular filter element 7. The end of the support tube which extends within the element is formed with an integral end wall 31 having perforations 32 therein a central dependent stud 33. At its other end the support tube is formed with castellations 34 which engage in an annular recessed portion 35 of the seal member 20 around the neck 24 thereof.

The portion of the support tube 30 which fits within the filter element 7 is formed with a plurality of longitudinal and circumferential grooves 36, 37 respectively therein so as to permit filtered oil to pass longitudinally in the spaces thereby provided between the support tube 30 and the inner periphery of the filter element 7.

The support tube 30 also has an external radial flange 38 extending therefrom, the flange 38 being adapted to abut one end of the filter element 7 adjacent the inner periphery thereof and form a seal therewith. The surface of the external flange 38 facing the end plate 10 is formed with a plurality of protrusions 39 thereon spaced about its periphery so that if the peripheral flange 21 on the seal member 20 is deflected inwardly towards the external flange 38 on the support tube 30 of the spaces between the protrusions 39 and the flange 21 will permit fluid flow from the exterior of the filter element 7 to the castellated axially extending portion of the support tube 30.

The central opening at the other end of the filter element 7 opening, the cap being pressed resiliently into sealing contact with said other end of the filter element 7 by integral resilient arms 41 on the end cap; alternatively a helical spring could be used, one end thereof bearing against the central recessed portion 42 of the end cap 40, and the other end of the spring abutting the base of the cup-shaped filter casing 6.

The center of the recessed portion 42 of the end cap 40 has therein a central aperture into which the dependent stud 33 at the base of the support tube 30 is press-fitted so as to retain the end cap and the flange 38 on the support tube 30 in sealing contact with opposite ends of the filter element 7. Alternatively the end cap 40 could be formed with an axially extending stud which could be press-fitted into a complementary opening in the end wall 31 of the support tube 30.

In the use of the filter unit 1 the pressure of the oil entering by way of the inlet openings 16 in the end plate 10 deflects the peripheral flange 21 on the seal member 20, the oil then flowing through the filter element 7 and passing by way of the grooves 36 and 37 on the support tube 30 to the openings 32 in the end wall thereof and thence through the central passage in the support tube to the central outlet opening 11 in the end plate 10. When there is no pressure of oil from the oil outlet passage 5 the flange 21 seats on the end plate 10 and prevent oil on the inlet side of the filter element 7 from draining back into the passage 5.

The portion of the support tube 30 which extends within the element 7 ensures that, when the filter unit 1 is arranged with the end plate 10 lowermost, not all of the oil within the filter unit can drain back into the engine when the latter is not operating to pump oil through the filter unit, the support tube thus acting as an antidrain back tube. The longitudinal and circumferential grooves 36, 37 on the outer surface of the support tube 30 permit a free flow of filtered oil between the support tube and the filter element.

If the element 7 becomes clogged, or the pressure drop across the filter element rises to an undesirably high value as, for example, when the oil is cold, the pressure of the oil will deflect the neck 24 of the seal member 20 from engagement with its annular seat in the support tube 30 and permit the oil to flow direct from the inlet openings 16 to the outlet opening 11 by way of the spaces between the castellations 34 in the end of the support tube 30. The protrusions 39 on the outer radial flange 38 of the support tube prevent such passage being obstructed by the deflected peripheral flange 21 on the seal member 30. The annular groove 25 (FIG. 7) will assist deflection of the neck 24 when the pressure drop across the element 7 reaches the critical value.

If desired, adhesive (not shown) may be applied to the surfaces of the flange 38 and of the end cap 40 which engage the ends of the element 7.

Figure 8:
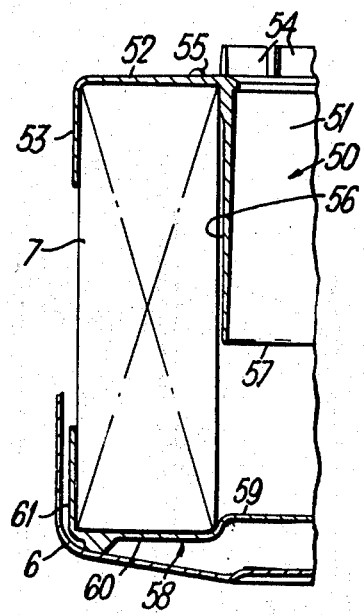
FIG. 8 is a partial vertical section of a modified form of construction of the filter unit shown in FIG. 1.

In the modified form of construction of the filter unit, shown in FIG. 8, the center tube is formed as a plastics moulding 50 and has a central tubular portion 51 which fits within the central opening in the annular filter element 7 and an integral radial flange portion 52 with a downturned peripheral skirt 53 which fits over one end portion of the filter element. The support tube 51 has castellated end portions 54, similar to the construction shown in FIGS. 1 to 5 and the radial flange portion 52 is similarly formed with projections 55 thereon to prevent the flow of oil to the castellations being stopped when the seal member 20 is deflected by oil entering the inlet openings 16.

In this embodiment the support tube is formed with longitudinal grooves 56 to allow free passage of oil from the filter element to the open lower end 57 of the support tube and from thence to the filter unit outlet 11.

In this embodiment the lower end of the central passage through the filter element 7 is closed by an end plate 58 which is conveniently formed of plastics and has a central recessed portion 59 which fits into the lower end of the central passage through the filter element 7, has an annular portion 60 which overlies the lower end of the filter element 7 and a peripheral annular skirt 61 which fits around the outer peripheral portion of the filter element 7 at its lower end. The flange portion 60 also has integral therewith resilient arms 62 which abut the base of the casing 6 so as to press the filter element and the support tube into engagement with the seal member 20 at the opposite end of the casing.

In the embodiment shown in FIG. 8 it is possible to use a filter element in which the ends of the pleats are not individually sealed separately from adjacent pleats, it being possible to effect such sealing by adhesive (not shown) applied to the inner surface of the portions 52 and 60 of the support tube 50 and end cap 58 respectively.

The construction and operation of the filter unit in this embodiment is otherwise as described with reference to FIGS. 1 to 5.

Figure 9:
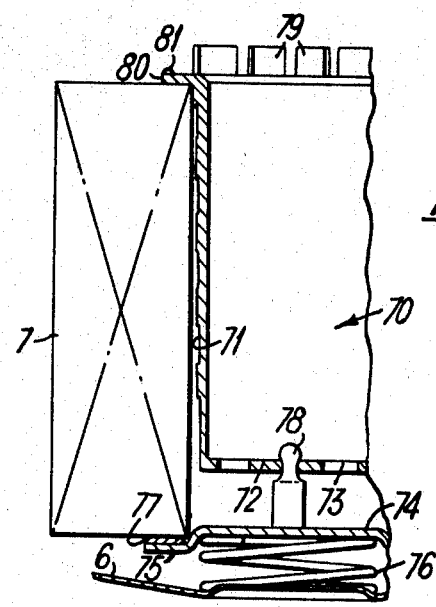
FIG. 9 is a partial vertical section of another modification of the construction of the filter unit shown in FIG. 1.

FIG. 9 shows a further alternative form of construction in which the support tube is formed as a member 70 of plastics which is of generally similar construction to that shown in FIGS. 1 to 5 but has a helical groove 71 in its outer surface to permit the free flow of oil from the filter element to the outlet opening 11.

In this embodiment the support tube 70 has a base 72 with openings 73 therein and the central passage through the filter element 7 is closed at its lower end by the central recessed portion 74 of an end plate 75 which is pressed into engagement with the filter element by a helical spring 76 one end of which is seated on the base of the filter casing 6 and the other end of which engages the recessed portion 74 of the end plate. As shown, a gasket 77 may be interposed between the end plate 75 and the filter element 7. The end plate 75 has an axially extending stud 78 which is press-fitted into a central opening in the base 72 of the support tube 70 to secure the end plate 75 and the support tube 70 in engagement with the filter element prior to insertion in the filter casing 6.

The support tube 70 is formed with castellations 79 at its upper end and with a radial flange 80 having outwardly extending protrusions 81 similar to the construction shown in FIGS. 1 to 5. The construction and operation of this embodiment of the filter unit is otherwise as previously described with reference to FIGS. 1 to 5.

It will be evident that a filter unit according to the invention has a relatively small number of parts, thus reducing the costs of manufacture and assembly, whilst including the desirable features of an antidrain back tube, a nonreturn valve, and a relief valve.

We claim:

1. In a liquid filter unit having an annular filter element within a cup-shaped casing closed by an end plate with a central outlet opening and inlet openings therearound respectively in communication with the inside and the outside of the filter element:

a support tube having an apertured end portion which extends axially beyond one end of the element, an opposite end portions portion which fits within one end of, and extends partially within, said element, and a radial flange which is in sealing contact with said one end of the element;

a combined seal and relief valve member formed of elastomeric material and comprising an annular disc which abuts the inner surface of said end plate and has a resiliently flexible outer peripheral flange portion which normally overlies said inlet openings and is in sealing contact with the inner surface of the end plate therearound, an inner peripheral portion which is in sealing contact with said end plate around said outlet opening, and, intermediate said peripheral portions, a coaxial tubular neck which is in resilient sealing contact with an internal annular portion of said support tube adjacent said apertured end portion;

an end cap which is held in sealing contact with the other end of said element and is resiliently biased so as to press the apertured end of the support tube into engagement with said disc around said neck; and said peripheral flange being resiliently deflectable under the pressure of liquid entering said inlet openings to permit liquid to pass into the casing for passage through the filter element, and said neck being resiliently deflectable at a predetermined pressure by liquid which passes from said inlet openings into contact with said neck by way of the openings in said apertured end portion of the support tube, to permit liquid entering the casing to bypass the filter element and flow direct to said outlet opening.

2. In a liquid filter unit having an annular filter element within a cup-shaped casing closed by an end plate with a central outlet opening and inlet openings therearound respectively in communication with the inside and the outside of the filter element, said element being formed of pleated sheet filter material with the ends of each pleat individually sealed separately from adjacent pleats:

a plastics support tube having a grooved outer surface, a castellated end portion which extends axially beyond one end of the element, an opposite end portion which fits within one end of, and extends partially within, said element, and, a radial flange which is in sealing contact with said one end of the element over at least the inner peripheral portion thereof;

a combined seal and relief valve member formed of elastomeric material and comprising an annular disc which abuts the inner surface of said end plate and has a resiliently flexible outer peripheral flange portion which normally overlies said inlet openings and is in sealing contact with the inner surface of the end plate therearound, an inner peripheral portion which is in sealing contact with said end plate around said outlet opening, and, intermediate said peripheral portions a coaxial tubular neck which is in resilient sealing contact with an internal annular portion of said support tube adjacent said apertured end portion;

an end cap which is held in sealing contact with the other end of said element and is resiliently biased so as to press the castellated end of the support tube into engagement with said disc around said neck; and said peripheral flange being resiliently deflectable under the pressure of liquid entering said inlet openings to permit liquid to pass into the casing for passage through the filter elements, and said neck being resiliently deflectable at a predetermined pressure by liquid which passes from said inlet openings into contact with said neck by way of the openings in said castellated end portion of the support tube, to permit liquid entering the casing to bypass the filter element and flow direct to said outlet opening.

3. In a liquid filter unit having an annular filter element within a cup-shaped casing closed by an end plate with a central outlet opening and inlet openings therearound respectively in communication with the inside and the outside of the filter element, said element being made of pleated sheet filter material with the ends of each pleat individually sealed separately from adjacent pleats:

a plastics support tube having a groove external surface, an apertured end portion which extends axially beyond one end of the element, a radial flange which is in sealing contact with said one end of the element over at least the inner peripheral portion thereof, and an opposite end portion which fits within one end of, and extends partially within, said element, and which terminates in a perforate end wall;

a combined seal and relief valve member formed of elastomeric material and comprising an annular disc which abuts the inner surface of said end plate and has a resiliently flexible outer peripheral flange portion which normally overlies said inlet openings and is in sealing contact with the inner surface of the end plate therearound, an inner peripheral portion which is in sealing contact with said end plate around said outlet opening, and, intermediate said peripheral portions a coaxial tubular neck which is in resilient sealing contact with an internal annular portion of said support tube adjacent said apertured end portion;

an end cap which is held in sealing contact with the other end of said element by interengaged formations on said end wall and end cap, said end cap having integral resilient members which engage the base of said casing to press the apertured end of the support tube into engagement with said disc around said neck; and said peripheral flange being resiliently deflectable under the pressure of liquid entering said inlet openings to permit liquid to pass into the casing for passage through the filter element and said neck being resiliently deflectable at a predetermined pressure by liquid which passes from said inlet openings into contact with said neck by way of the openings in said apertured end portion of the support tube so as to permit liquid entering the casing to bypass the filter element and flow direct to said outlet opening.

4. A filter unit according to claim 2, in which the outer surface of said support tube has intersecting longitudinal and circumferential grooves therein to facilitate the flow of filtered liquid from said element into the interior of said support tube.

5. A filter unit according to claim 1, in which one end of a helical spring abuts a seat in the base of said cup-shaped casing and the other end of said spring abuts said end cap to press said end cap into sealing engagement with said element and press said support tube into engagement with said seal and relief valve member.

6. A filter unit according to claim 1, in which said radial flange on said support tube and said end plate each have an integral peripheral skirt which respectively fit around peripheral portions of said element at opposite ends thereof.

7. A filter unit according to claim 3, in which said radial flange on the support tube has projections thereon to prevent the peripheral flange on said seal member from forming a seal with said radial flange when said peripheral flange is deflected.

PO-1050
(5/69)

UNITED STATES PATENT OFFICE
CERTIFICATE OF CORRECTION

Patent No. 3,567,023     Dated March 2, 1971

Inventor(s) Kenneth E. Buckman and Derrick P. Tuffnell

It is certified that error appears in the above-identified patent and that said Letters Patent are hereby corrected as shown below:

Column 1, line 69, "start form" should be -- star-form --; line 71, "pleat" should be -- pleats --; line 74, the non-printed portion should read -- from each other to permit a ready flow of filtered liquid therethrough. The construction of such a filter element is --.

Column 2, line 74, the non-printed portion should read -- adjacent the base of the filter casing 6 is closed by an end cap 40 with a central recessed portion 42 which fits within said --.

Column 3, line 53, "the" (first occurrence) should be -- a --.

Column 4, line 55, delete "portions"; line 75, delete "and".

Column 5, line 40, delete "and"; line 44, "elements" should be -- element --.

Column 6, line 2, "groove" should be -- grooved --; line 21, after the semicolon (;) insert -- and --; line 27, after the semicolon (;) delete -- and --.

Signed and sealed this 14th day of September 1971.

(SEAL)
Attest:

EDWARD M.FLETCHER,JR.
Attesting Officer

ROBERT GOTTSCHALK
Acting Commissioner of Patent